United States Patent [19]

Alheim

[11] Patent Number: 5,450,470
[45] Date of Patent: Sep. 12, 1995

[54] SCRIPT GENERATOR AND PROCESS FOR PROGRAMMING AUTOMATED TDD TELEPHONE SYSTEM APPLICATION

[75] Inventor: Curtis C. Alheim, Schenectady, N.Y.

[73] Assignee: DiRAD Technologies, Inc., Albany, N.Y.

[21] Appl. No.: 381,298

[22] Filed: Jan. 31, 1995

Related U.S. Application Data

[63] Continuation of Ser. No. 134,401, Oct. 7, 1993, abandoned, which is a continuation-in-part of Ser. No. 887,677, May 22, 1992, Pat. No. 5,253,285, which is a continuation-in-part of Ser. No. 626,753, Dec. 13, 1990, Pat. No. 5,121,421.

[51] Int. Cl.$^6$ ............................................. H04M 11/00
[52] U.S. Cl. ......................................... 379/52; 379/97; 340/825.19
[58] Field of Search ............................... 379/52, 96–99, 379/396, 93, 444; 340/825.19; 381/51

[56] References Cited

U.S. PATENT DOCUMENTS

| | | | |
|---|---|---|---|
| 3,381,276 | 4/1968 | James | 340/172.5 |
| 3,426,555 | 1/1984 | Underkoffler . | |
| 4,012,599 | 3/1977 | Meyer . | |
| 4,268,721 | 5/1981 | Nielson et al. . | |
| 4,307,266 | 12/1981 | Messina . | |
| 4,320,256 | 3/1982 | Freeman . | |
| 4,608,457 | 8/1986 | Fowler et al. | 379/52 |
| 4,677,659 | 6/1987 | Dargan | 379/97 |
| 5,121,421 | 6/1992 | Alheim | 379/52 |
| 5,157,759 | 6/1990 | Bachenko | 381/51 |
| 5,163,081 | 11/1992 | Wycherley et al. | 379/52 |
| 5,253,285 | 10/1993 | Alheim | 379/52 |

FOREIGN PATENT DOCUMENTS

| | | | |
|---|---|---|---|
| 58-134568 | 8/1983 | Japan | 379/52 |
| 1-162059 | 6/1989 | Japan | 379/52 |
| 2183880 | 6/1987 | United Kingdom | 379/52 |

OTHER PUBLICATIONS

D. G. Schmitt et al, "An Experimental Study of Synthesized Speech Intelligibility Using Text Created by Tele-Communication Device for the Deaf (TDD) Users" IEEE, 1990.

*Primary Examiner*—Wing F. Chan
*Attorney, Agent, or Firm*—Heslin & Rothenberg

[57] ABSTRACT

A computer-based script generator and associated method for programming TDD displayable messages in an automated interactive telephone communication system (ATS) which connects to a two-way telephone subscriber network for automated processing of communication signals from an individual caller communicating therewith over the telephone subscriber network using a TDD coupled to the network. The script generator and associated processing are computer-based and include entering a TDD displayable message in entered script format for transfer to the ATS; translating the TDD displayable message from the entered script format into a corresponding TDD script format with reference to predefined dictionary and rule databases; and transferring the TDD displayable message of TDD script format to the ATS. The predefined databases correlate selected plain language script with TDD language script and provide rules for coordinating the translation of the TDD displayable message from entered script format to TDD script format.

27 Claims, 5 Drawing Sheets

SCRIPT GENERATOR AND PROCESS FOR PROGRAMMING AUTOMATED TDD TELEPHONE SYSTEM APPLICATION

CROSS-REFERENCE TO RELATED APPLICATIONS

This application is a continuation, of application Ser. No. 08/134,401, filed Oct. 7, 1993, now abandoned, which is a continuation-in-part of U.S. application Ser. No. 07/887,677, filed May 22, 1992, and entitled "Automated Interactive Telephone Communication System for TDD Users," which is to issue on Oct. 12, 1993 as U.S. Pat. No. 5,253,285, which itself is a continuation-in-part of Ser. No. 626,753, filed Dec. 13, 1990, now U.S. Pat. No. 5,121,421, entitled "Interactive Telephone Communication System For Hearing-Impaired Person," issued on Jun. 9, 1992. The entireties of both U.S. application Ser. No. 07/887,677 and U.S. Pat. No. 5,121,421 are hereby incorporated herein by reference.

COPYRIGHT NOTICE

A portion of the disclosure of this patent document contains material which is subject to copyright protection. The copyright owner has no objection to the facsimile reproduction by anyone of the patent disclosure, as it pertains in the Patent and Trademark Office patent files or records, but otherwise reserves all copyright rights whatsoever.

BACKGROUND OF INVENTION

1. Technical Field

The present invention relates to communication systems and, more particularly, to a novel automated telephone script generator for use with an interactive telephone communication system for TDD users. The script generator automatically translates typically spoken language prompts of an automated telephone system into equivalent TDD prompts for process/routing customization of an automated interaction telephone communication system to be accessed by TDD users. Preferably, the script generator accepts characters of any spoken language for automated translation into appropriate universal Baudot script accessible by a TDD user/caller.

2. Description of the Prior Art

Two-way telephone systems, which allow national and worldwide communication between individuals, normally provide for reception and output of sound energy. Because of this, deaf, hard-of-hearing and speech-impaired individuals (herein collectively referred to as "TDD users") were until recently prevented from communicating over this network. Specifically, teletype/telecommunication devices for the deaf (TDDs), also referred to as text-telephones (TT), are now readily available and many public and private organizations have special telephone numbers for deaf, hard-of-hearing, and speech-impaired individuals to call devoted exclusively to telecommunications using TDD equipment, such as a relay service. A TDD unit conventionally communicates with another TDD unit using specially coded tone signals, e.g, Baudot and like codes. When a Baudot signal is received, the TDD equipment converts the signal into a visual format for display to the user. In this manner, two individuals are able to visually communicate directly using an existing telephone subscriber network as the carrier.

Increasingly, there is a trend in both the public and private sector towards streamlining the handling of incoming telephone calls by the use of pre-recorded interactive voice systems. Verbal interrogation systems, or verbal multiple choice response systems are well known, such as exemplified by the system described in U.S. Pat. No. 4,320,256 and the patents cited therein. However, such interactive voice systems obviously terminate communication for a deaf or hard-of-hearing person. (Since a deaf caller is unable to hear verbal instructions, the caller cannot jump to an appropriate electronic mailbox or extension.)

The cross-referenced U.S. Pat. No. 5,121,421 is designed to address this deficiency of existing interactive telephone interrogation technology and provide a deaf individual with the same direct access to automated telephone services, including: automated attendant, "audio" text retrieval, transaction processing, etc., as that now enjoyed by hearing individuals. The interactive telephone communication system also helps businesses using automated telephone systems to comply with the 1990 Americans with Disabilities Act by providing equal caller access.

There are many manufacturers in the voice processing market of specific 24-hour automated telephone system applications for hearing individuals. Titles II and III of the 1990 Americans with Disabilities Act require that public and private entities which provide a service (such as an automated telephone system) to the taxpayer or general public must make that service accessible to individuals with disabilities, regardless of their disability and in the manner which best suits their needs. Thus, the manufacturers (or their distribution channels) which build (market) voice applications for the general public must now customize their systems for TDD callers.

Currently there are few standards among automated voice processing manufacturers such that confusion is common. There are many different embodiments of how these voice systems are scripted and touch tone responses are requested. Making them palatable to the eye when read across a TDD for the deaf community is just as important as making them palatable to the ear for listening over the phone by the hearing community.

In view of the above, a flexible automated telephone script generator for implementing interactive telephone TDD applications is believed to comprise a significant technology advancement in communication systems for hearing impaired individuals. Further, such a script generator wherein standardized language for the deaf caller is employed will significantly facilitate communication between an automated communication system and the TDD user. Thus, in one novel system, a Baudot script generator is provided which allows convenient message customization of an automated interactive telephone communication system for hearing impaired individuals, as well as provides communication language standardization for the TDD users.

DISCLOSURE OF THE INVENTION

Briefly summarized, the present invention comprises in one aspect a computer-based script generator for programming TDD displayable messages in an automated interactive telephone communication system (ATS) such as that presented in the incorporated U.S. Pat. Nos. 5,121,421 and 5,253,285. The ATS connects to a two-way telephone subscriber network for automated processing of communication signals from an individual caller communicating therewith over the telephone subscriber network using a TDD coupled to the network. The ATS includes a computer database containing a plurality of separately addressed, digitally encoded TDD displayable messages. The computer-based script generator includes input means for entering a TDD displayable message for transfer to the ATS. The TDD displayable message has an entered script format. Computer means translates the TDD displayable message from the entered script format into a corresponding TDD script format. Finally, output means transfers the TDD displayable message in TDD script format to the ATS for storage in its computer database. Various enhancements to the computer-based script generator are presented and claimed. For example, translation of the TDD displayable message in entered script format to TDD script format preferably proceeds with reference a predefined dictionary database correlating plain language script with TDD language script and a predefined rules database for coordinating translating of the TDD displayable message from entered script format to TDD script format.

In another aspect, the present invention comprises a computer-based TDD which connects to a two-way telephone subscriber network for direct communication with a remotely located TDD call recipient. The computer-based TDD includes input means for entering a TDD displayable message having an entered script format, and a computer-based means for translating the TDD displayable message from the entered script format into a corresponding TDD script format. Output means then transfers the TDD displayable message in TDD script format across the two-way telephone subscriber network to the TDD call recipient. An advantage of this computer-based TDD is that an operator need not necessarily be knowledgeable in TDD language script in order to concisely communicate with the TDD call recipient.

In yet another aspect, the present invention comprises methods corresponding to the various device embodiments disclosed and claimed.

The interactive telephone communication system (ATS) of the incorporated U.S. Pat. Nos. 5,121,421 and 5,253,285 provides a hearing-impaired caller with substantially the same automated telephone processing and information options as now enjoyed by hearing persons employing an automated voice processing system. The ATS is advantageously implementable with commercially available technologies and can accommodate voice, Baudot, ASCII and other types of communication signals. The ATS script generator presented herein allows an operator to easily program TDD displayable messages to a local or remote TDD automated telephone system (ATS). The script generator automatically translates entered plain language text into a TDD script format for transfer to the TDD ATS. Further, the ATS script generator can be employed as a standard TDD using available software or, more preferably, can function as an enhanced TDD station wherein any individual can readily communicate in TDD script format notwithstanding entering of plain language text.

BRIEF DESCRIPTION OF THE DRAWINGS

These and other objects, advantages and features of the present invention will be more readily understood from the following detailed description of certain preferred embodiments of the present invention, when considered in conjunction with the accompanying drawings in which.

BEST MODE FOR CARRYING OUT THE INVENTION

Figure 1:
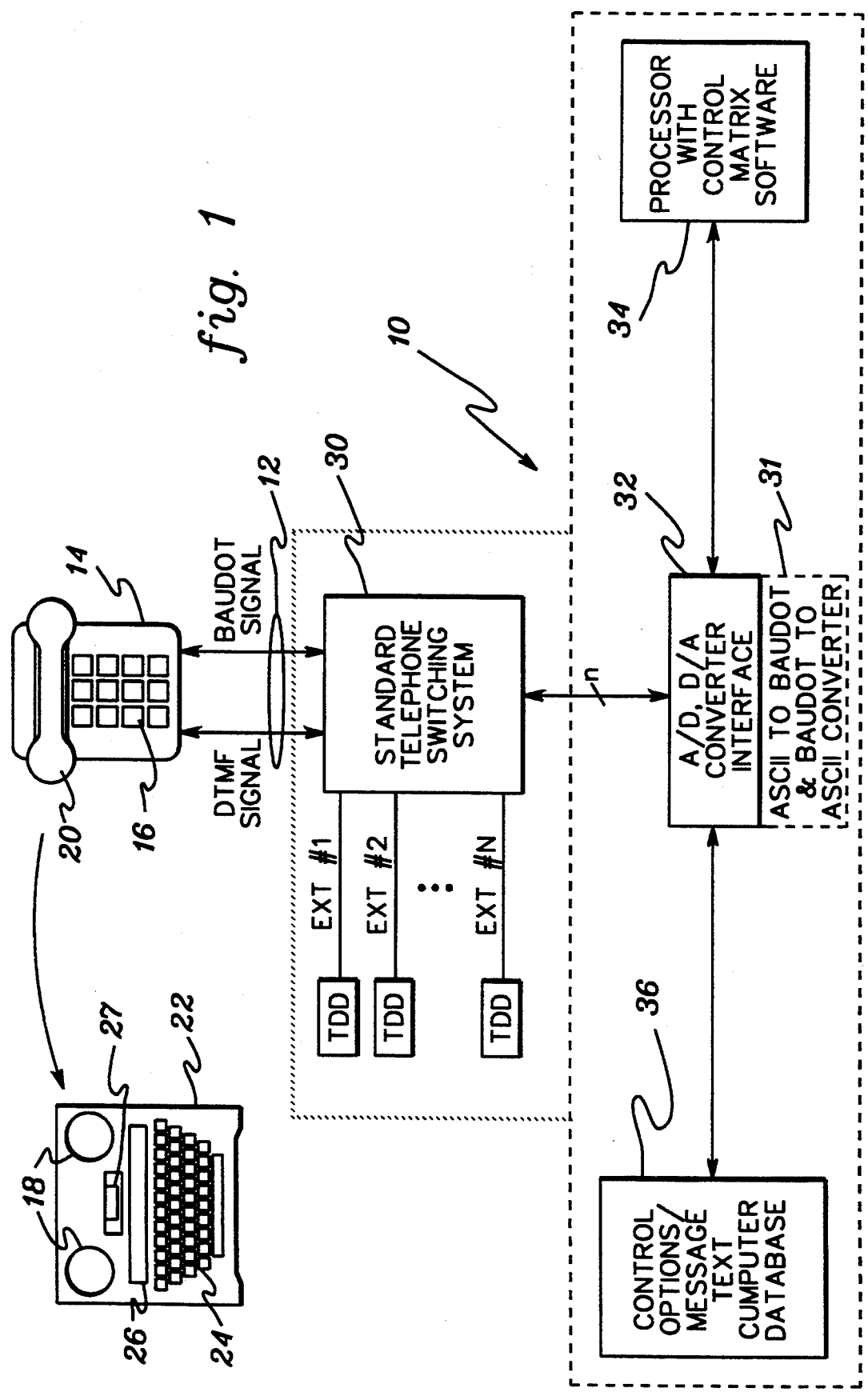
FIG. 1 is a block diagram of an automated telephone system for hearing impaired individuals pursuant to incorporated United States Pat. No. 5,121,421.

Refer now to the drawings, wherein the same reference numbers are used throughout multiple figures to designate the same or similar components. The patents initially incorporated herein describe an automated interactive telephone communication system for hearing-impaired individuals, one embodiment of which is depicted in FIG. 1, and generally denoted 10.

System 10 is coupled to a conventional two-way telephone subscriber network 12 which includes at least one touch-tone-type telephone 14 coupled thereto. Telephone 14 comprises a conventional touch-tone-type telephone, such as available from AT&T, which includes a tone generator for selectively transmitting a plurality of unique frequencies separated by tone signal outputs over the two-way telephone subscriber network 12 and a key pad 16 which is conventionally connected to the tone generator for selecting the unique tone signal outputs to be transmitted over telephone subscriber network 12. More detailed information on the functioning of conventional touch-tone-telephone 14 is available in the open literature; for example, see the discussion thereof provided by Freeman in U.S. Pat. No. 4,320,256, the entirety of which is hereby incorporated herein by reference.

Coupled to telephone 14, e.g., by acoustic coupling through acoustic couplers 18 and telephone handset 20, is a teletype or telecommunications device for the deaf 22 (herein referred to as a "TDD"). TDD 22 can comprise any commercially available TDD which allows deaf, hard-of-hearing or speech-impaired individuals to communicate over a two-way telephone subscriber network. Two principal manufacturers/marketers of TDD equipment for the deaf are Ultratec of Madison, Wis. and Krown Research, Inc. of Culver City, Calif. As described further below, a computer with appropriate TDD conversion software, such as Fulltalk ™ marketed by Microflip of Glendale, Md., can also comprise a TDD.

TDD 22 includes a key pad 24 and a visually perceptible display 26, e.g., an LED display. In certain models, a hard copy printer 27 is also available. As is well know, unit 22 is conventionally used to communicate with another TDD (not shown) via a special code (i.e., Baudot) which when received is either converted into a readable message and presented on display 26 or stored in memory. In operation, a TDD user places a call to another individual who also has a TDD device by using the conventional touch-tone telephone, and once connection is established with the telephone call recipient, communication thereafter is through the TDD units and, in particular, the keyboards and associated displays.

A significant improvement taught by the initially incorporated patents, U.S. Pat. Nos. 5,121,421 and 5,253,285, comprises an automated telephone attendant system for interactive use by a hearing-impaired person employing a TDD. This system, referred to herein as an automated telephone system (ATS) is assumed to be connected to the two-way telephone subscriber network so as to be separately addressable via a unique dialing code for enabling selective connection of the ATS to any telephone caller in the telephone subscriber network 12. A plurality of telephone callers could typically be accommodated by the automated telephone system at substantially the same time.

As shown in FIG. 1, automated telephone system 10 includes an automatic telephone switching system 30 connected to network 12 and a plurality of telephone extensions, EXT #1, EXT #2, . . . , EXT #N, therefrom. Preferably, each extension EXT #1, EXT #2, . . . , EXT #N, has a TDD coupled or readily available thereto for communicating with a caller using TDD unit 22. Switching system 30 is well known in the open literature and comprises any conventional electronic telephone switching system for routing various calls to the subscribers throughout the network dependent on the entered input to the switching system by the telephone subscribers. The functioning of the telephone switching system 30 is well understood by those of ordinary skill in the art. Any standard electronic telephone switching system 30 may be employed in system 10. Typically, system 30 will include a standard private branch exchange (PBX) coupled to the telephone subscriber network 12. A phantom line surrounds switching system 30 in FIG. 1 to emphasize that telephone switching system 30 may be unnecessary depending upon the implementation. For example, call switching or call forwarding may be unneeded if only databases or account searching capabilities are desired.

Coupled to switching system 30 on the extension side is a telephone interface, herein referred to as A/D, D/A converter interface 32. Converter interface 32 may comprise any commercially available telephone interface card. One such card is manufactured by Dialogic Corp. of Parsippany, N.J. 07054, and marketed as a Dialogic D41A communications card. Converter interface 32 transforms analog tone waveforms into digital signals, and preferably to discrete binary form for processing/storage. Pursuant to this embodiment, converter 32 transforms received DTMF signals into digital form for processing and converts stored messages from digital form to TDD receivable form, e.g., ASCII to Baudot (i.e., via interface 31), as described below. Further, the referenced Dialogic interface is capable of accommodating multiple communications simultaneously, as is the rest of system 10. Also, those skilled in the art will be able to readily accomplish conversion of ASCII stored messages to Baudot signals using the above-referenced Dialogic interface and appropriate system 10 software.

Coupled to converter 32 is a processor 34 and an associated database storage 36. Processor 34 comprises any mini- or microcomputer based machine which contains automated telephone attendant application software, including an appropriate processing control matrix. A preferred application software package is marketed by Microlog of Germantown, Md. 20874, as Microlog Application Software for Voice Interrogation Telephone System. Possible processor logic flow or control matrices are discussed in U.S. Pat. Nos. 5,121,421 and 5,253,285.

Computer database 36 preferably comprises a hard disk drive having conceivably hundreds of hours of message storage, e.g., 600–800 megabytes. The large data storage in system 10 is necessary to accommodate the TDD displayable messages, e.g., messages converted from ASCII, or coded directly in Baudot. Storage of Baudot messages requires three-four times the amount of disk storage for the same message content as voice systems; however, as noted, ASCII to Baudot conversion is possible to minimize disk storage space. Contained in database 36 are various messages, such as those set forth in the control matrices described in the initially incorporated patents.

These control matrices include control options and/or other message text which may be selectively retrieved for transmission to a hearing-impaired caller, i.e., depending upon the logic path of processor 34 within the applicable control matrix. Unique to the systems described in U.S. Pat. Nos. 5,121,421 & 5,253,285 is the storage of TDD displayable messages, e.g., Baudot or other similar codes, for retrieval and transmission to a TDD caller through the control matrix of processor 34. A retrieved message is transformed to analog form by converter 32 and then sent through switching system 30, network 12 and telephone 14 to TDD 22 where the series of coded tones is converted to digital code for printing of characters on display 26.

Various modules can be implemented in Baudot for access by a hearing-impaired individual, such as automated attendant, "audio" text retrieval, transaction processing, voice mail and interface to a mainframe for database searching. Applications for the system include: automated job availability; information hotlines (e.g., transportation information); interactive educational programs; home shopping markets; emergency notification and community alert programs; health monitoring systems for independent living; pre-registration of out-patient health care; quality of care information; account balance and expiration dates; forms and publication requests; school registration and course selection; etc.

Figure 2:
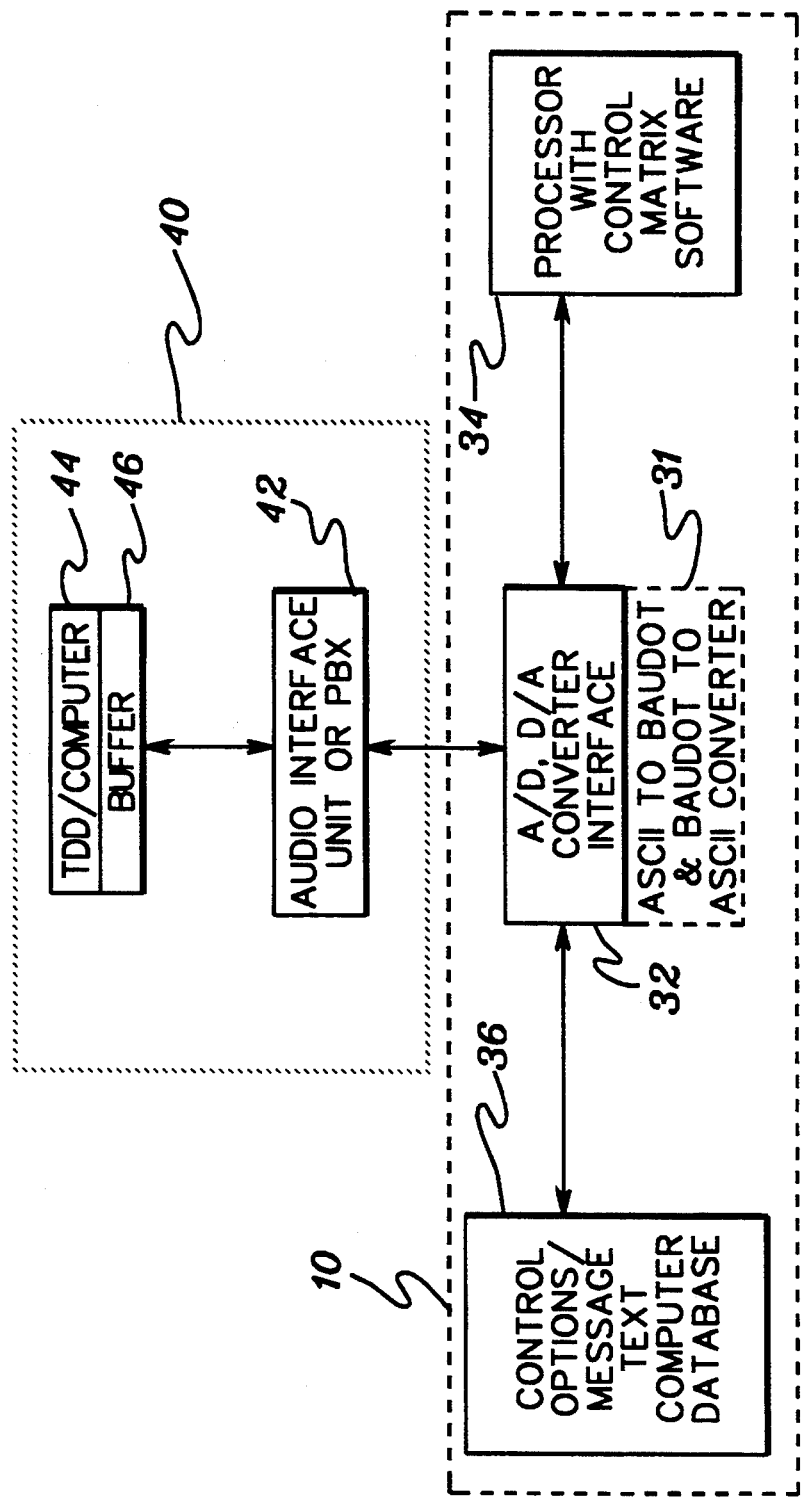
FIG. 2 is a block diagram representation of one circuit embodiment useful in explaining programming of TDD displayable messages into the automated telephone system of FIG. 1.

One approach to storing of TDD displayable messages, described in U.S. Pat. Nos. 5,121,421 and 5,253,285, is depicted in FIG. 2 and briefly discussed below.

TDD displayable messages (e.g., Baudot messages) are input to system 10 via an input system 40 configured as shown. Input system 40 is coupled to converter interface 32 and, in particular, to the above-referenced Dialogic interface card. The referenced Microlog automated telephone application software can be used, via processor 34, to store information on hard disk 36. System 40 includes an audio interface unit (AIU) or PBX 42 and a TDD or computer 44 for input of messages. AIU/PBX 42 is coupled to converter interface 32 of system 10. One commercially available AIU 42 is manufactured and marketed by Microlog as an audio interface unit.

TDD/computer 44 can comprise a commercially available TDD model having a memory buffer 46 therein. For example, an Ultratec TDD Superprint ES unit (marketed by Ultratec of Madison, Wisconsin) contains 8k of memory which allows transmission of prestored messages. Once initiated, transmission from such a TDD is at a fixed 45.5 Baud, which is the standard rate for communications between TDD units in the United States. (In Europe, the standard rate is 50 Baud.) Thus, by predefining messages in memory buffer 46 it is possible to transmit a message to hard disk 36 at a standard rate for recordation, which means that whenever the message is retrieved by processor 34 it will be transmitted from system 10 at the same uniform rate. Another option, but less preferred, would be to use TDD equipment having no memory buffer in which case inputted messages would be sent directly through the audio interface unit and converter interface 32 to the database exactly as typed. This means that any delays between typing of characters and/or errors in typing would be stored to the hard disk substantially as they occurred.

As Baudot encoded messages are transmitted to system 10 for storage under a corresponding message number, converter 32 digitizes the information and processor 34 stores it in database 36 at an application program defined location. Again, system 10 can utilize the referenced Microlog application software which includes logic for storing messages. These same commands could be used to store Baudot coded messages for subsequent recall and display on a hearing-impaired caller's TDD.

Another approach to storing of TDD displayable messages in system 10 is to use a word processor to enter ASCII coded messages which are stored on hard disk 36 of system 10. ASCII to Baudot interface 31 then converts a retrieved message to TDD decodable tones for transmission over network 12 to a caller's TDD. As noted above, those skilled in the art can accomplish this conversion using the referenced Dialogic card and appropriate software for processor 34.

Another, and preferred, approach to storing of digitally encoded, TDD displayable messages in system 10 is described below with reference to FIG. 3.

Figure 3:
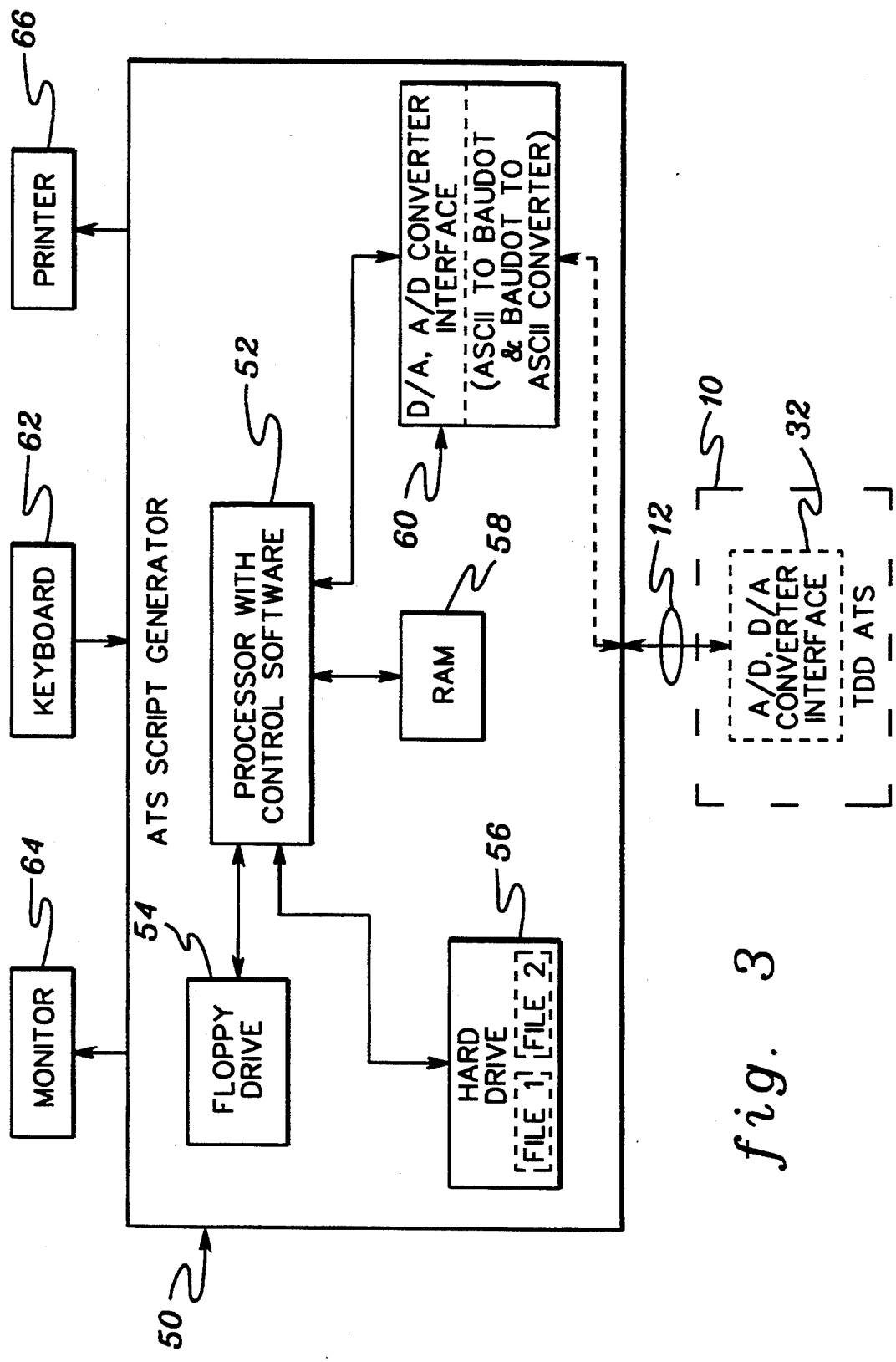
FIG. 3 is a block diagram schematic of an automated telephone system (ATS) script generator pursuant to the present invention.

FIG. 3 depicts an automated telephone system (ATS) script generator, generally denoted 50. Generator 50, which can be implemented using any commercially available '286, '386 or '486 microcomputer, facilitates an operator's "programming" or downloading of TDD displayable messages to automated telephone system 10 for hearing-impaired individuals, also referred to as TDD ATS 10. As used herein, the term "programming" includes programming new messages or editing or deleting existing TDD displayable messages within TDD ATS 10. Generator 50 can be located either proximate to or remote from the TDD ATS 10.

ATS script generator 50 includes a controller (processor with control software) 52 connected to a floppy drive 54, a hard drive 56; RAM storage 58 and a D/A, A/D converter interface having ASCII to Baudot & Baudot to ASCII conversion capabilities 60, such as a MIC 300i modem card marketed by Microflip of Glendale, Md. Floppy drive 54 can be used for backup or for input of prestored TDD displayable messages to the script generator for uploading to the automated telephone system 10 undergoing programming. More conventionally, messages can be entered into workstation 50 by an operator using a keyboard 62 and a monitor 64 coupled thereto. Hard copy printout of TDD displayable messages is available through a printer 66.

Hard drive 56 can contain conventional software such as operating software (e.g., MS-DOS) and a memory manager. In addition, hard drive 56 (or RAM 58) is assumed to contain two separate data storage files, herein referred to as "file #1" and "file #2". Also on hard drive 56 are programming software, tables for translating entered messages into TDD formatted messages, and (preferably) any commercially available software product for microprocessor mimicking of a TDD. These features of the ATS script generator are discussed in detail below.

Continuing with FIG. 3, converter 60 of script generator 50 preferably functions as a modem for transmitting TDD formatted messages to automated telephone system 10 undergoing programming. One commercially available modem which also functions as an ASCII to Baudot and Baudot to ASCII converter is marketed by Microflip of Glendale, Md., as model MIC 300i. Converter 60 connects via a standard RJ-11 telephone connection to two-way telephone subscriber network 12, and hence to the automated telephone system 10 for TDD users (and, more particularly, to A/D, D/A converter interface 32). Connection would be made through a switching device (PBX) or AIU that emulates a telephone switching to generate a ring voltage and notify A/D, D/A converter interface 32 that connection is made (i.e., an "off-hook" condition) to ATS script generator 50. Thus, an ATS script generator 50 pursuant to the present invention can be disposed local to the TDD ATS undergoing message programming or remote therefrom.

An ATS script generator in accordance with the present invention includes at least two advantageous features. First, the script generator allows an operator to readily program TDD displayable messages within a TDD ATS disposed locally or remotely from the workstation via the two-way telephone subscriber network. Secondly, the script generator can be used by a non-TDD-educated individual to readily communicate with a remote, TDD-caller in TDD-formatted language. These features are next described with reference to the flowcharts of FIGS. 4–6, which comprise one embodiment of script generator processing in accordance with the present invention.

Figures 4, 5:
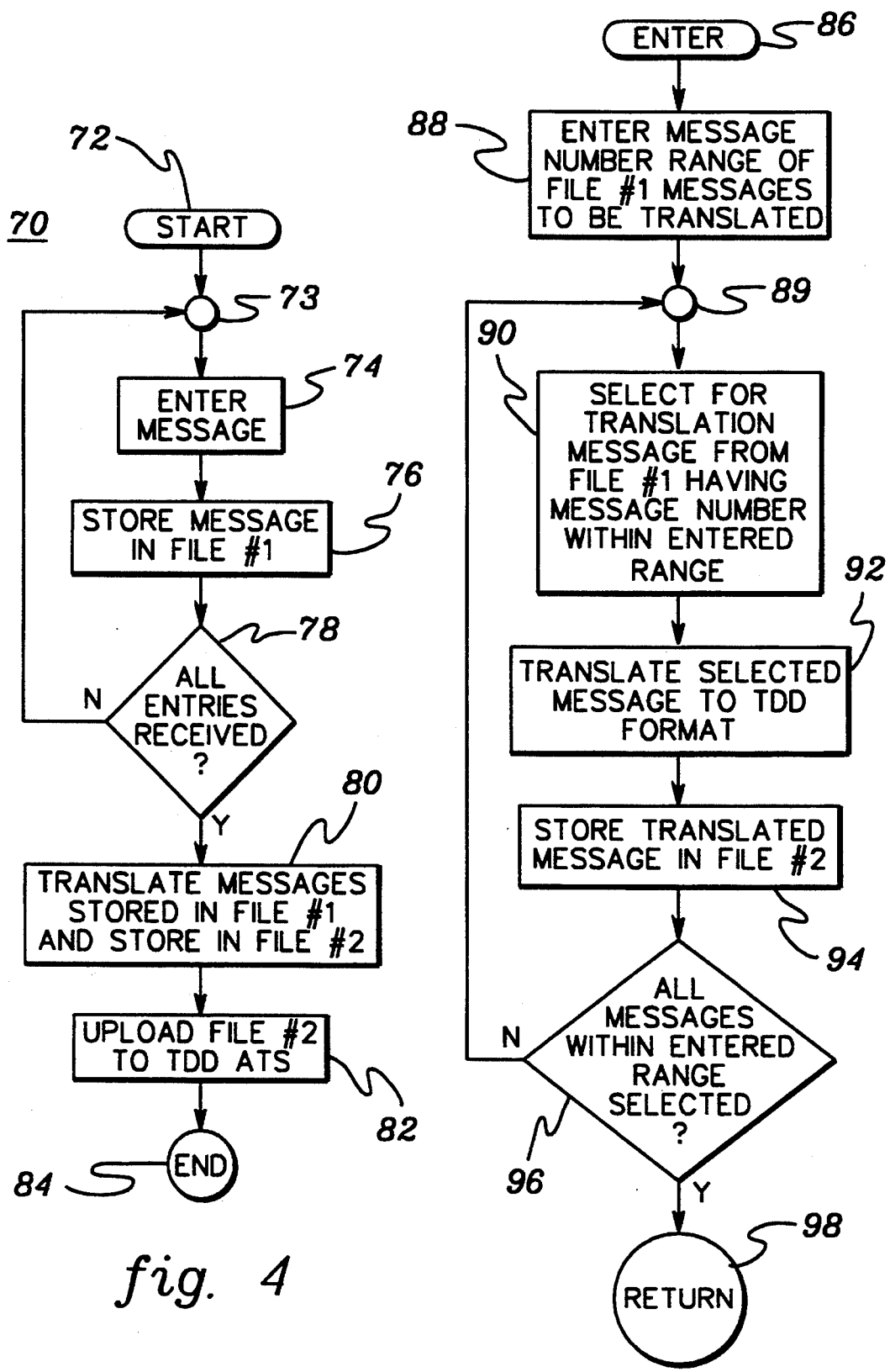
FIG. 4 is a functional overview of one embodiment of workstation processing pursuant to the present invention.
FIG. 5 is a functional block diagram of one embodiment of the translate stored messages block of FIG. 4, wherein an entered script format is translated to a TDD script format automatically.

FIG. 4 depicts a functional flowchart embodiment 70 of the ATS script generator procedure for adding, changing, or deleting a TDD displayable message within the TDD ATS. After initiating processing, 72 "Start," an operator (by way of example) enters a message to be added to a TDD automated telephone system structured and functioning in accordance with the teachings U.S. Pat. Nos. 5,121,421 and 5,253,285. U.S. Pat. No. 5,253,285 depicts and discusses one embodiment of a message typically provided by the automated telephone system 10 (FIGS. 1–3) to a hearing-impaired TDD caller. Preferably, a "message number" (e.g., 4 bits in length) is associated with each entered message. This message number is then used within the control matrix of the ATS for accessing by the TDD caller.

Next, the entered message is stored in file #1 of memory, such as hard drive memory 56 within the ATS workstation, 76 "Store Message In File #1." Once the message is stored, the maintenance routine inquires whether all entries have been received for processing, 78 "All Entries Received?," and if "no", return is made via junction 73 to instruction 74 "Enter Message." As noted, TDD displayable messages can be either downloaded in mass to the ATS script generator e.g., via a floppy, or manually entered via keyboard 62 (FIG. 3). At this point, the entered message(s) is(are) assumed to have (for example) a plain English, Spanish, or other spoken language "entered script format."

Once all message entries have been entered into the script generator, the controller next translates a stored message in file #1 into a "TDD script format" and then restores the translated messages in file #2, 80 "Translate Messages Stored In File #1 And Store In File #2." (This function is discussed in further detail below with reference to the processing flow of FIG. 5.) Once all entered messages have been translated into TDD script format and stored, the next generator function is to upload selected stored information from file #2 to the TDD ATS undergoing programming/reprogramming, 82 "Upload File #2 to TDD ATS." (One embodiment of upload processing is discussed below with reference to FIG. 6.) Once the TDD formatted information has been uploaded to the automated telephone system, the maintenance function 70 is complete, 84 "End."

As a specific example, C++ language source code for a script generator maintenance function in accordance with the present invention is attached hereto as Appendix A. Those skilled in the art will note, however, that the provided source code and functional outline of FIG. 4 could be varied without departing from the central concepts of the present invention as defined by the appended claims.

One translation routine for translate messages block 80 of FIG. 4 is set forth in FIG. 5. This routine begins, 86 "Enter," with a message number range being entered which defines the range of stored messages in file #1 to be translated to TDD message format, 88 "Enter Message Number Range Of File #1 Messages To Be Translated." Next, one of the messages within the entered message number range is selected from file #1 for translation of the corresponding message and restoring thereof to file #2, whereby the entered script format is translated to a TDD script format, 90 "Select For Translation Message From File #1 Having Message Number Within Entered Range."

Next, the selected message is translated to TDD message format, 92 "Translate Selected Message To TDD Format." By way of example, this feature is accomplished by predefining a dictionary of TDD terms correlated with standard spoken English terms. (Obviously, the concept could also be implemented employing any non-English language with appropriate corresponding TDD correlations in that language.) Table 1 provides an example of certain conventional and proposed TDD abbreviations for a variety of "plain English" words. To the extend that a TDD abbreviation is unconventional, use of a ATS workstation in accordance with the present invention to program the each of a plurality of TDD automated telephone systems (constructed in accordance with the teachings Pat. Nos. 5,121,421 and 5,253,285), will tend to standardize the abbreviations and equivalent words known by most TDD users.

TABLE 1

| TDD ABBREV. | TERM |
|---|---|
| A | (not used), blank space |
| ABBREV | Abbreviation |
| ABT | About |

TABLE 1-continued

| TDD ABBREV. | TERM |
|---|---|
| AM | Morning |
| ANS | Answer |
| APR | April |
| APT | Apartment |
| ASST | Assistant |
| AUG | August |
| BLDG | Building |
| CA | Communication Assistant |
| CORP | Corporation |
| DEC | December |
| DR | Doctor |
| EXT | Extension |
| FEB | February |
| FED | Federal |
| FRI | Friday |
| GOVT | Government |
| HD, HLD | Hold |
| INFO | Information |
| JAN | January |
| LTR | Letter |
| LV | Leave |
| NGR | Manager |
| MIN | Minute |
| MON | Monday |
| MSG | Message |
| MTG | Meeting |
| NBR | Number |
| NITE | Night |
| NOV | November |
| NP | No Problem |
| OCT | October |
| OPR | Operator |
| ORGAN. | Organization |
| PLS | Please |
| PM | Afternoon, Evening |
| PBLM | Problem |
| PRES. | President |
| R | Are |
| REC | Receive |
| RPT | Repeat |
| SAT | Saturday |
| SEPT | September |
| SUN | Sunday |
| TECH | Technology |
| TELECOM | Telecommunications |
| THE | (not used), blank space |
| THURS | Thursday |
| THRU | Through |
| THX | Thanks |
| TMW, TRW | Tomorrow |
| TRANS | Transfer |
| TTD | Teletypewriter |
| TUES | Tuesday |
| TXFR | Transfer |
| U | You |
| UNIV | University |
| UR | Your |
| VP | Vice President |
| WED | Wednesday |
| WKND | Weekend |

Table 2 identifies certain TDD substitute terms for selected English words/punctuation.

TABLE 2

| TDD TERM | VOCABULARY |
|---|---|
| AGENT | Representative |
| AT 'GA' | At the tone |
| ASK | Prompt |
| ASSIGN | Designate |
| BOOK | Catalogue, Literature |
| BUILDING (noun) | Complex |
| BUSINESSES | Organizations, Institutions |
| CAN | Are Able |
| CAR | Automobile/Vehicle |
| CHANGE | Modify |
| CHEMICAL | Insecticide |

TABLE 2-continued

| TDD TERM | VOCABULARY |
|---|---|
| COLLEGE (noun, NOT pronoun) | University |
| COMMUNITY | Constitutients |
| CORRECT | Valid |
| DANGEROUS | Hazardous |
| DIAL | Press |
| DO | Perform |
| DOCTOR | Physician/Pediatrician |
| DOLLAR | $ |
| FOLLOWS | Compliant/Comply |
| GIVE | Provide |
| GIVE | Submitted |
| HELP | Assistance |
| INCH(ES) | " |
| MANY | Multiple |
| MENU | Set of Options |
| POUND | # |
| PRIVATE | Confidential |
| READ | Listen/Hear |
| RECEIVED | Entitled |
| READ AGAIN | Playback |
| RECORDED BEFORE | Prerecorded |
| REQUIREMENTS | Criteria |
| RETURN | Go Back |
| RETURN | Redeem |
| SAME | Routine |
| SET-UP | Establish |
| SCHOOLS | Institutions |
| SIGNED | Endorsed |
| STAR | * |
| START | Activate |
| STOP | Prevent |
| TYPE | Enter |
| WRONG | Invalid |
| 24-HOUR | Automated |
| / | And |

Table 3 depicts further TDD abbreviations for the fifty states of the United States and certain cities therein.

TABLE 3

| TDD ABBREV. | STATE |
|---|---|
| ALA | Alabama |
| ALASKA | Alaska |
| ARIZ | Arizona |
| ARK | Arkansas |
| CALIF | California |
| COLORADO | Colorado |
| CONN | Connecticut |
| DEL | Delaware |
| DC | District of Columbia |
| FLA | Florida |
| GEORGIA | Georgia |
| HAWAII | Hawaii |
| IDAHO | Idaho |
| ILL. | Illinois |
| IND | Indiana |
| IOWA | Iowa |
| KAN. | Kansas |
| KENT. | Kentucky |
| LOUIS. | Louisiana |
| MAIN | Maine |
| MARY. | Maryland |
| MASS. | Massachusetts |
| MICH. | Michigan |
| MINN. | Minnesota |
| MISS. | Mississippi |
| MISSOURI | Missouri |
| MONT. | Montana |
| NEB | Nebraska |
| NEV. | Nevada |
| N. H. | New Hampshire |
| NJ | New Jersey |
| N. M. | New Mexico |
| NY | New York |
| NC | North Carolina |
| ND | North Dakota |
| OHIO | Ohio |
| OKLAH | Oklahoma |
| ORE. | Oregon |
| PENN. | Pennsylvania |
| RI | Rhode Island |
| SC | South Carolina |
| S. D. | South Dakota |
| TENN | Tennessee |
| TEX. | Texas |
| UTAH | Utah |
| VER. | Vermont |
| VA | Virginia |
| WASH | Washington |
| WEST VA. | West Virginia |
| WISC | Wisconsin |
| WYOMING | Wyoming |
| BOSTON | Boston |
| CHICAGO | Chicago |
| DC | Washington DC |
| DEN. | Denver |
| LA | Los Angeles |
| N. O. | New Orleans |
| NY | New York |
| PHIL | Philadelphia |
| ROCH. | Rochester (NY) |

Again, Tables 1-3 are provided by way of example only. The concept is to incorporate within the ATS script generator a "dictionary" correlating predefined TDD terms with plain English/sentence structure correlations. Thus, TDD displayable messages entered into the generator may comprise plain English messages (i.e., entered script format, which are then automatically translated by the script generator into a "standardized" TDD script format. Where available, the TDD formatted terms comprise conventional terms used by the hearing-impaired during TDD communication.

In addition to the dictionary, translation of an "entered script format" into a "TDD script format" also preferably involves the application of certain predefined TDD communication rules, such as the following:

1. No abbreviation of an organization name at first occurrence.

2. Spell out any symbol which requires a shift key on a standard keyboard.

3. Always use "GA" at the end of an option choice or when asking a TDD caller to input a response.

4. Only use commas when separating groups within a sentence. If there are subgroups within an option use the '/' key. For within an option use the '/' key. For example: DIAL 1 - TECH DEPT, Dial 2 - ADMIN, DIAL 3 - HELP; can become: DIAL 1 - TECH/ADMIN DEPTS, DIAL 2 - HELP 5. When within option choices, use "-" in place of word 'to'.

6. When typing long messages which contain repeating terms, abbreviate the terms. State the abbreviation in parenthesis at first occurrence of the term.

7. Minimize use of periods or hyphens.

8. Avoid use of numbers in place of words.

9. Avoid overuse of abbreviations, which may cause sentence ambiguity.

10. Always type name when introducing yourself to a TDD call recipient.

11. When typing a response, request the TDD caller to employ TDD keys, and not touch-tone telephone pads.

12. When identifying a telephone number, inform the caller as to whether the number is a TDD number or a voice only number.

Other rules could be added or substituted for those set forth above. Again, the concept is to predefine by way of a dictionary and/or applicable rules a basis for converting a message entered in plain English automatically into a TDD message format. This feature of an ATS script generator in accordance with the present invention can also be employed independent of the concept of message programming a TDD ATS. For example, a script generator fitted with the translation capabilities would allow an individual unfamiliar with TDD communication formatting to readily converse with a remote hearing-impaired, TDD call recipient having a direct TDD connection to the generator via the two-way telephone subscriber network.

Continuing with FIG. 5, once a message has been translated into TDD message format, the translated message is stored in File #2, 94 "Store Translated Message In File #2." Thereafter, inquiry is made into whether all messages within the entered message number range (instruction 88) have been selected for reformatting, 96 "All Messages Within Entered Range Selected?" If "no", return is made via junction 89 to instruction 90 for selection of a next message having a message number within the entered range. Once all messages have been reformatted, the processor returns to point of call, 98 "Return," such as instruction 80 of the maintenance processing flow 70 of FIG. 4.

One C++ language source code implementation of the conversion routine of FIG. 5 is appended hereto as Appendix B. Those skilled in the art can readily produce other generator processing implementations of the concepts presented.

Figure 6:
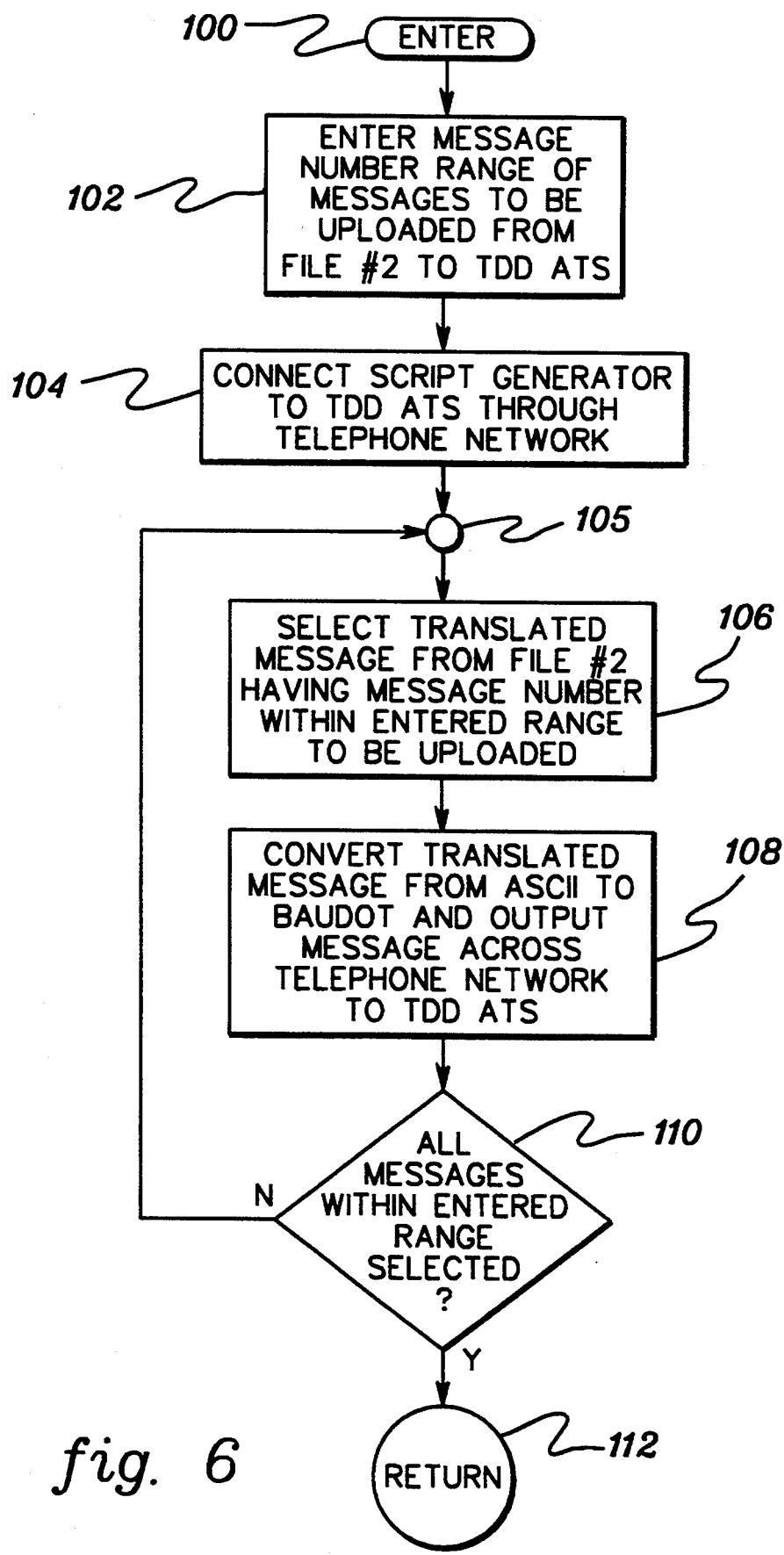
FIG. 6 is a functional block diagram of one embodiment of the upload file #2 block of FIG. 4, wherein TDD script formatted signals are transmitted over a two-way telephone subscriber network to a TDD automated telephone system in accordance with the teachings of the patents initially incorporated herein.

FIG. 6 depicts one processing flowchart of the upload file #2 function of FIG. 4 for transferring reformatted TDD messages from the ATS script generator to a remote, TDD automated telephone system, such as that of FIG. 3. The routine begins, 100 "Enter," with a range of message numbers being entered which identifies the messages to be uploaded from file #2 to the remote TDD ATS, 102 "Enter Message Number Range Of Messages To Be Uploaded From File #2 To TDD ATS." Once the message number range is established, the ATS workstation is coupled to the particular TDD automated telephone system to be programmed, e.g., via the standard two-way telephone subscriber network, 104 "Connect Workstation To TDD ATS Through Telephone Network."

One of the TDD formatted messages with a message number within the entered range is selected from file #2 for uploading to the remote TDD ATS, 106 "Select Translated Message From File #2 Having Message Number Within Entered Range To Be Uploaded." The translated message is converted from ASCII to Baudot and outputted across the telephone subscriber network as an analog signal to the remote TDD ATS, 108 "Convert Translated Message From ASCII To Baudot And Output Message Across Telephone Network TDD ATS." As noted above, conversion of the translated message from ASCII format to Baudot format is readily accomplished by D/A converter interface 60 (FIG. 3) with ASCII to Baudot and Baudot to ASCII conversion capabilities, such as the MIC 300i modem marketed by Microflip.

Next, inquiry is made into whether all messages within the entered range have been selected, 110 "All Messages Within Entered Range Selected?" and if "no", the controller returns to instruction 106 via junction 105. Once all the messages within the range have been selected, the controller is directed by the routine to return to point of call, 112 "Return."

One C++ language source code implementation of an upload routine in accordance with the present invention is appended hereto as Appendix C. As with the other appendices, those skilled in the art can readily program other source code implementations of the processing concepts presented.

As noted briefly above, an ATS script generator in accordance with the present invention can comprise an enhanced TDD for use by an individual uneducated in conventional TDD language and grammar as used by hearing-impaired individuals. For example, one skilled in the art will recognize that the processing flowcharts presented can be modified to allow direct outputting of entered messages from the workstation after translation thereof from an entered message format to a TDD message format using the predefined rules and dictionary concepts.

As a further enhancement, commercially available software can be added to the ATS script generator for converting the workstation into a "standard operating" TDD. Once such software package is marketed as Fulltalk TM by Microflip of Glendale, Md. When the ATS script generator is used in standard operating TDD mode, an operator can readily access a newly programmed or reprogrammed TDD ATS to verify the correct uploading of TDD displayable messages just transferred from the generator to the TDD ATS.

It will be observed from the above description that the interactive telephone communication system (ATS) of the incorporated U.S. Pat. Nos. 5,121,421 and 5,253,285 provides a hearing-impaired caller with substantially the same automated telephone processing and information options as now enjoyed by hearing persons employing an automated voice processing system. The ATS is advantageously implementable with commercially available technologies and can accommodate voice, Baudot, ASCII and other types of communication signals. The ATS script generator presented herein allows an operator to easily program TDD displayable messages to a local or remote TDD automated telephone system (ATS). The script generator automatically translates entered plain language text into a TDD script format for transfer to the TDD ATS. Further, the ATS script generator can be employed as a standard TDD using available software or, more preferably, can be an enhanced TDD station wherein any individual can readily communicate in TDD message format simply by entering plain language text.

Although specific embodiments of the present invention have been illustrated in the accompanying drawings and described in the foregoing detailed description, it will be understood that the invention is not limited to the particular embodiments described herein, but is capable of numerous rearrangements, modifications and substitutions without departing from the scope of the invention. The following claims are intended to encompass all such modifications.

APPENDIX A

Maintenance Software for A.T.S Workstation

© 1993 DiRAD Technologies, Inc.

```
//***********************MESSAGING FUNCTIONS NEW & EDIT***********************
//*****************************************************************************
//***************************************************************************** include <iostream.h>
include <stdio.h>
#include <string.h>
#include <graph.h>
#include <stdlib.h>
#include <ctype.h>
#include <conio.h>
#include "keys.h"
#include "wpproto.h"

typedef unsigned int WORD;
typedef unsigned char BYTE;

char name[31];
char num_buffer[5]; /*definitions of variables declared in
                                              wpproto.h*/
char desc_buffer[50];
char msg_buffer[6400];
char word_buf[20];
int line_len[80];
int line_num;
int column_num;
int position;
int num_lines;

void WPMain()
{ /*control word processor*/

_settextcursor(NO_CURSOR);
DisplayMenuLine('a');  /*display maintain messages menu*/

ResetText_Buf(strlen(num_buffer),num_buffer);/*reset msg num buffer*/
ResetText_Buf(strlen(desc_buffer),desc_buffer);/*description buff*/
ResetText_Buf(strlen(msg_buffer),msg_buffer); /*msg buffer*/
```

```
Branch(); /*branch to proper function based on menu choice*/
}/*main*/ void Branch()
{
WORD choice;
choice = getachar();  /*function in misc.cpp*/

_settextcursor(NO_CURSOR);

switch(choice) {
        case F1: NEW(); break;
        case F2: EDIT(); break;
        case F3: DELETE(); break;
        case F4: SAVE(); break;
        case F5: CONVERT('w'); break; /*function in convert.cpp*/
        case F6: VIEW();break;
        case F9: HELP(); break; /*function in help.cpp*/
        case F10: {
                MainMenu(); /*call main menu*/
                break;
        }/*case F10*/
        default: break;
} /*switch*/

WPMain();

}/*Branch*/

/*******************************NEW*******************************/
void NEW()
{
WORD choice;

struct _videoconfig vc;
_getvideoconfig(&vc); /*get current video configuration*/

_clearscreen(_GWINDOW);

DisplayMenuLine('b'); /*display new menu*/
_settextcursor(NO_CURSOR);

choice = getachar();  /*get the menu choice*/ switch(choice) { /*branch based on the choice*/
        case F1: EnterMsgNumber(); break; /*enter msg number*/
        case F2: EnterMsgDesc(); break; /*enter msg description*/
        case F3: EnterMsg(); break; /*enter msg text*/
        case F4: SAVE(); break;
        case F5: CONVERT('w'); break;
        case F9: HELP(); break;
        case F10:
```

```
            case ESC: WPMain(); break;  /*return to maintain msgs menu*/
            default: NEW();
}/*switch*/
NEW();

}/*NEW*/ void EnterMsgNumber()
{ /*get msg number of current msg, new or old*/
struct _videoconfig vc;
_getvideoconfig(&vc); /*get current video configuration*/

_clearscreen(_GCLEARSCREEN); /*clear whole screen*/

DisplayMenuLine('f'); /*display help/exit menu*/
ResetText_Buf(strlen(num_buffer),num_buffer); /*reset msg num buffer*/ int RED = 4;
int WHITE = 7;
_settextwindow(1,1,vc.numtextrows-4,vc.numtextcols);
_settextcolor(RED);
_outtext("Message Number: "); /*display at top of screen*/
_settextwindow(1,17,2,vc.numtextcols); /*create text window for
                                                                                    number input*/
_settextcursor(LINE_CURSOR);
_settextposition(1,1);
_settextcolor(WHITE);

WORD a;
for (int i=0;;i++) {
        a = getachare();
        switch(a) {
                case F9: { /*if F9 is pressed (help)*/
                        HELP();
                        ResetScreen('n',1,i,i);
                        break;
                }/*case F9*/
                case ESC:
                case F10: { /*F10 is pressed */
                        ResetText_Buf(strlen(num_buffer),num_buffer); /*reset msg num buffer*/
                /*window to clear*/
                        _settextwindow(1,1,1,vc.numtextcols);
                        NEW(); /*return to new menu*/
                        break;
                }/*case F10/ESC*/
                case RETURN: { /*a return is pressed*/
                        _settextwindow(2,1,vc.numtextrows,vc.numtextcols);
                        NEW(); /*return to new menu*/
                        break;
                }/*case RETURN*/
                case BACK_SPACE: { /*if back space is pressed*/
                        i--;
```

```
                    _settextposition(1,i+1); /*move the cursor back 1*/
                    _outtext(" "); /*replace current text with a blank*/
                    num_buffer[i]=NULL_CHAR;
                    i--;
                    _settextposition(1,i+2);
                }/*case /BACK_SPACE*/
                default: {
                    if ((a > 48) || (a<58)) num_buffer[i]=a; /*if it is a digit*/
                }/*default*/
            }/*switch*/
    }/*for*/

}/*EnterMsgNumber()*/ void EnterMsgDesc()
{
DisplayMenuLine('f'); /*display help/exit menu*/
ResetText_Buf(strlen(desc_buffer),desc_buffer);

struct _videoconfig vc;
_getvideoconfig(&vc); /*get current video configuration*/ int RED = 4;
int WHITE = 7;

_settextwindow(3,1,5,vc.numtextcols);  /*set text window*/
_settextposition(1,1);
_settextcolor(RED);
_outtext("Description: ");

_settextwindow(3,14,5,vc.numtextcols);  /*set description text window*/
_settextcursor(LINE_CURSOR);
_settextcolor(WHITE);

_clearscreen(_GWINDOW);
column_num = -1; /*screen column number*/ int test = 0;
int test_value = 0; /*checks to see if it is the first character
                                        in the description*/
for(;;) { /*continue until F10 or ESC is pressed*/
        unsigned int a = getchar(); /*get characters from keyboard*/
        switch (a) {
                case RETURN: { /*character is an <enter>*/
                        _settextwindow(5,1,vc.numtextrows-4,vc.numtextcols);
                        NEW(); /*text has been entered, return to new menu*/
                        break;
                }/*case RETURN*/
                case F9: { /*character is F9 key -- call help*/
                        HELP();
                        test = 1;
```

```
            break;
    } /*case F9*/
    case F10:
    case ESC: { /*character is F10 or ESC -- call new menu*/
            ResetText_Buf(strlen(desc_buffer),desc_buffer);
            /*window to clear*/
            _settextwindow(3,1,5,vc.numtextcols);
            NEW();
            test = 1;
            break;
    }/*case F10, ESC*/
    case BACK_SPACE: { /*character is a backspace key*/
      column_num--;
            _settextposition(1,column_num+1);
            _outtext(" "); /*output blank space*/
            desc_buffer[column_num] = 32; /*reset buffer char*/
            _settextposition(1,column_num+1);
            test_value = 1;
            break;
    }/*case BACK_SPACE*/
    case UP_ARROW: /*character is up or down arrow*/
    case DOWN_ARROW: break;
    case LEFT_ARROW: { /*character is left arrow*/
            column_num--; /*mover cursor one left*/
            _settextposition(1,column_num+1);
            test_value = 1;
            break;
    }/*case LEFT_ARROW*/
    case RIGHT_ARROW: { /*character is right arrow*/
            column_num++; /*mover cursor one right*/
            _settextposition(1,column_num+1);
test_value = 1;
            break;
    }/*case RIGHT_ARROW*/
    default: { /*character is any other key*/
            if ((a>31) && (a<126)) { /*ascii value between 31
                                                                    and 126*/
                    if (test_value == 0) column_num++; /*character
                                    is first one in the string*/
                    _settextposition(1,column_num+1);
                    _putch(a); /*output character to screen*/
                    desc_buffer[column_num] = a; /*assign value of
                                    character to proper part of string*/
                    column_num++; /*set cursor at next position*/
                    _settextposition(1,column_num+1);
                    test_value = 1;
            }/*if*/
                    break;
    }/*case default*/
}/*switch*/
if (test == 1) break; /*F10 or ESC is pressed, exit for
                                                loop return to new menu*/
}/*for*/
```

}/*EnterMsgDesc*/

```c
void EnterMsg()
{
struct _videoconfig vc;
_getvideoconfig(&vc); /*get current video configuration*/

ResetLine_Len();
ResetText_Buf(strlen(msg_buffer),msg_buffer);

position = 0; /*position of character in msg buffer*/
column_num = 1; /*screen column number*/
line_num = 1; /*msg line number*/
num_lines = 1; /*number of lines in msg*/
int char_count = 0; /*word_buf character counter*/
int test = 0; /*when test==1, stop getting characters*/
int RED = 4;
int WHITE = 7;

_settextwindow(6,1,6,vc.numtextcols);
_settextposition(1,1);
_settextcolor(RED);
_outtext("Message:");

_settextwindow(7,1,vc.numtextrows-4,vc.numtextcols);
_settextcursor(LINE_CURSOR);
_settextposition(1,1);
_settextcolor(WHITE);

for(;;) { /*continue until F10 or ESC is pressed*/
        unsigned int a = getachar(); /*get characters from keyboard*/
        switch (a) {
                case RETURN: {
                        Return(a,0);
                        break;
                }/*case RETURN*/
                case F1: EnterMsgNumber(); break;
                case F2: EnterMsgDesc(); break;
                case F3: EnterMsg(); break;
                case F4: {
                        SAVE();
                        break;
                } /*case F3*/
                case F5: CONVERT('w'); break;
                case F9: { /*character is F9 key -- call help*/
                        HELP();
                        break;
                } /*case F9*/
                case F10:
                case ESC: { /*character is F10 or ESC -- call new menu*/
                        ResetWord_Buf(word_buf);
                        ResetText_Buf(strlen(msg_buffer),msg_buffer);
                        /*window to clear*/
```

```c
        _settextwindow(6,1,vc.numtextrows-4,vc.numtextcols);
        NEW();
        test = 1;
        break;
}/*case F10, ESC*/
case INSERT: {
        ResetWord_Buf(word_buf);
        DisplayInsert();
        ResetTextMode(7,1,vc.numtextrows-4,vc.numtextcols, \
                                        line_num, column_num);
        InsertChar();
        break;
}/*case INSERT*/
case DEL: {
        Delete();
        break;
}/*case DEL*/
case BACK_SPACE: { /*character is a backspace key*/
        Back_Space();
        break;
}/*case BACK_SPACE*/
case UP_ARROW: { /*character is up arrow*/
        Up_Arrow(0);
        break;
} /*case UP_ARROW*/
case DOWN_ARROW: { /*character is down arrow*/
        Down_Arrow(0);
        break;
} /*case DOWN_ARROW*/
case LEFT_ARROW: { /*character is left arrow*/
        Left_Arrow(0);
        break;
}/*case LEFT_ARROW*/
case RIGHT_ARROW: { /*character is right arrow*/
        Right_Arrow(0);
        break;
}/*case RIGHT_ARROW*/
case HOME: {
        Home();
        break;
}/*case HOME*/
case END: {
        End();
        break;
}/*case END*/
default: { /*character is any other key*/
        if ((a>31) && (a<126)) { /*ascii value between 31
                                                        and 126*/
                _settextposition(line_num,column_num);
                _putch(a); /*output character to screen*/ msg_buffer[position] = a; /*assign value of
                        character to proper part of string*/
                        position++;
```

```c
            line_len[line_num] = column_num;

if (column_num >= vc.numtextcols-20) { /*if the
                    column number is between 60 and 80*/
                if (column_num == vc.numtextcols-20) {
                        char_count = 0; /*set buffer count to 0*/
                } /*if column_num ...*/
                if (isspace(a)) { /*if a is a space*/
                        ResetWord_Buf(word_buf); /*reset buffer*/
                        char_count = 0;
                } /*if isspace*/
                if (!isspace(a)) { /*if a isn't a space
                        assign its value to the word wrap buffer*/
                        word_buf[char_count]=a;
                        char_count++;
                } /*if !isspace*/
        if ((column_num == vc.numtextcols) && \
                        (!isspace(a))) {
                /*if the column number equals the number of
                columns and the current key isn't a space*/
                line_len[line_num]=vc.numtextcols-char_count;
                NewWordWrap(char_count);
                num_lines = line_num;

/*reset column, position variables*/
            column_num = char_count;
            position++;
        } /*if column_num...&&...*/
        else if (column_num == vc.numtextcols) {
                /*the current variable is a space*/
                line_len[line_num]=vc.numtextcols;
                column_num = 0;
                line_num++;
                num_lines++;
                _settextposition(line_num,column_num);
                _putch(a);
        } /*else*/
        } /*if column_num >=...*/
        column_num++; /*set cursor at next position*/
        _settextposition(line_num,column_num);
    }/*if a>31 && ...*/
            break;
        }/*case default*/
    }/*switch*/
    if (test == 1) break; /*F10 or ESC is pressed, exit for
                                    loop return to new menu*/
}/*for*/

}/*EnterMsg*/

/************************EDIT****************************/
void EDIT()
{
```

```
cout << "EDIT OPTION NOT AVAILABLE AT THIS TIME.\n";

}/*EDIT*/

/***************************SAVE***************************/
void SAVE()
{
int WHITE = 7;

short top_L, top_R, bot_L, bot_R; /*text window dimensions*/
_gettextwindow(&top_L, &top_R, &bot_L, &bot_R);
int col = column_num;
int row = line_num;
int pos = position;

MakeFileName('e',0);

ResetScreen('a',row,col,pos);

WriteToFile('e');
ResetScreen('a',row,col,pos);

}/*SAVE*/

/***************************DELETE***************************/
void DELETE()
{ cout << "DELETE OPTION NOT AVAILABLE AT THIS TIME\n";

}/*DELETE*/

/***************************VIEW***************************/
void VIEW()
{ cout << "VIEW OPTION NOT AVAILABLE AT THIS TIME\n";

}/*VIEW*/
```

APPENDIX B

Conversion Software for A.T.S Workstation

© 1993 DiRAD Technologies, Inc.

```
//*****************************CONVERSION UTILITIES********************************
//**********************************************************************************
//********************************************************************************** include "keys.h" /*key definitions*/
include "wpproto.h"
include <iostream.h> void CONVERT(int from)
{
int dir_known = 0;

if (num_buffer[0] == NULL_CHAR) {;
        MakeFileName('e',dir_known);
        GetText();
        dir_known = 1;
}/*if*/ if (from == 'w') ResetScreen('a',line_num,column_num,position);
else ResetScreen('u',line_num,column_num,position);
MakeFileName('c',dir_known);
if (from == 'w') ResetScreen('a',line_num,column_num,position);
else ResetScreen('u',line_num,column_num,position);

WriteToFile('c');

}/*CONVERT*/
```

APPENDIX C

Upload Software for A.T.S Workstation

© 1993 DiRAD Technologies, Inc.

```c
//*******************************************************************************
//***************************SEND MESSAGE FUNCTION*******************************
//******************************************************************************* include "MIC300i.h"
include "Data.h"
#include "keys.h"
#include "proto.h"
#include "variable.h"
#include <conio.h>
#include <ctype.h>
#include <dos.h>
#include <stdio.h>

BYTE far *in_pointer, far *out_pointer, far *buf_pointer;

/************************************************************************
                        Transmit code
*************************************************************************/ void transmit(WORD outchar)
{
        if (tty==TRUE)       /* tdd mode only */
        {
                if ((char_count>60)||(outchar==RETURN)||((char_count>50)&&(outchar==SPACE)))
                {
                        char_count=0;
                        comout(BAUD_LF);
                        comout(BAUD_CR);
                }
                if (outchar!=RETURN)
                        ascbaud(outchar);
        }
        else                 /* ascii mode only */
        {
                outchar &= mask;     /* mask to 7 or 8 bits */
```

```c
                comout(outchar);
                if (outchar==RETURN)
                        comout(LINEFEED);
        }
} void (_interrupt _far *getio)(void);
void (_interrupt _far *s4interrupt)(void);
void (_interrupt _far *s3interrupt)(void);
void __near __cdecl milli_delay(unsigned int);

void tmenu(void);
void send_msg(char *msg);
void view_msg(void);
char __near* select_msg(void);
void converse(void);

/****transmit function section***/ void tmenu(void)
{
        char screen[3];
        int conv;
        char *letter;
        char newletter;
        char transmitmenu[]="\n[F1]DIAL [F2]HANGUP [F3]VIEW [F4]SEND [F5] CONVERSE [F9]HLP [F10]EXIT\n";
        int inchar;
        WORD inchar2;
        char *testmsg;
        char msg1[100]="This is an UltraSilent test message\n";
        char msg2[100]="This is a test msg including nbrs 12 13 6 7 so on\n";
        char msg3[100]="Yet another msg with 125 876 and char to...\n";
        char *phone[20];
        initial();   /* initialize internal modem card */
        conv = FALSE;
        for (;;)
        {
                for (int x=1;x<30;x++)
                  printf("\n");
                printf(transmitmenu);
                inchar = INVALID;
                freceive = FALSE;   /* if freceive = true, data received from sio */
                while ((_kbhit() == 0 ) && ( freceive == FALSE ))
                {
                        if ((hook_flag == UNHOOK) && (conv == TRUE))
                        {
                          inchar2 = receive();   /* get any character from the buffer */
                          if (inchar2 != 255)
                                {
```

```
                printf("character: %c",inchar2);
                }
            abcheck();
        }
}
if ( freceive == FALSE )
{   /* keyboard processing here */
        inchar = getachar();
        setparm( inchar ); /* set telecommunication parameters */
        switch( inchar )
        {
        case TNULL: /* already processing in setparam */
                break;
        case F1:    /* Enter phone number & Dial */
                printf("Enter Phone Number: ");
                gets(*phone);
                printf("Dialing... %s\n", *phone);
                speaker(2);
                dialer(*phone);
                printf("back in test1.cpp\n");
                continue;
        case F2:    /* hang up */
                initial();
                hook(TRUE);
                continue;
        case F3:    /*view msg*/
                view_msg();
                printf("\n\n");
                printf("this section must be updated\n");
                printf("\n\n");
                printf("press any key to return to previous menu...\n");
                getch();
                continue;
        case F4:    /* send message */
                do
                    {
                    SelectMsg();
                    send_msg(msg_buffer);
                    printf("Send another message (Y or N): ");
                    inchar = getachar();
                    }
                while ((inchar == 'Y') || (inchar == 'y'));
                continue;
        case F5:    /* testing conver **/
            if (conv == FALSE)
                conv = TRUE;
            converse();
            continue;
        case F6:    /* Answer the phone */
                sanswer();    /* answer the phone and go into ascii checking */
                printf("answer phone mode not done \n");
                inchar = TNULL;
                continue;
        case F9:  /* help section */
```

```
            printf("help section no done\n");
            continue;
        case F10: /* exit */
            hook(TRUE);
            goto STOP;
        case BACK_SPACE:
            printf("%c",inchar);
            transmit( BACK_SPACE );
            continue;
        case DEL:
            printf("%c",inchar);
            transmit( BACK_SPACE );
            continue;
        default:
            printf("%c",inchar);
            transmit( inchar );
            continue;
        }
    }
    else /* receive data processing here */
    {
        if ((hook_flag == UNHOOK) && (conv == TRUE))
        {
            inchar2 = receive();   /* get any character from the buffer */
            if (inchar2 != 255)
            {
                printf("%c",inchar2);
            }
            abcheck();
        }

}
}
```

I claim:

1. A computer-based TDD script generator for programming displayable messages of TDD script format in an automated interactive telephone communication system (ATS) which connects to a two-way telephone subscriber network for automated processing of communication signals from an individual caller communicating therewith over the telephone subscriber network with a TDD coupled to the network, the ATS including a computer database for containing a plurality of separately addressed, digitally encoded displayable messages, said computer-based TDD script generator comprising:

means for entering a displayable message for transfer to the ATS, said displayable message having an entered Plain-English ASCII script format;

computer means for automatically translating said displayable message from said entered Plain-English ASCII script format into a corresponding standardized TDD script format, said translation providing standardized word substitutions, abbreviations and syntax of TDD visual language with reference to a predefined rules database correlating selected plain language script with substitute standardized TDD language script;

means for transferring said displayable message in said standardized TDD script format to the ATS for storage in its computer database.

2. The computer-based TDD script generator of claim 1, wherein said means for entering said displayable message comprises at least one of a keyboard electrically coupled to the computer means for manual entering of said displayable message and a floppy disk drive electrically coupled to the computer means for automated downloading of said displayable message.

3. The computer-based TDD script generator of claim 1, wherein said computer means for translating further includes a matrix of predefined rules which provides certain logic for coordinating the translation of said displayable message from said entered Plain-English ASCII script format to said standardized TDD script format.

4. The computer-based TDD script generator of claim 1, wherein said transferring means includes means for transferring said displayable message in said standardized TDD script format to the ATS over the two-way telephone subscriber network.

5. The computer-based TDD script generator of claim 1, wherein said transferring means includes means for converting said displayable message in said standardized TDD script format as an ASCII signal to a Baudot signal for transfer of said displayable message to the ATS.

6. The computer-based script generator of claim 4, wherein the digital signal to analog signal converting means comprises a modem having a D/A, A/D converter interface.

7. A method for generating a displayable message of TDD script format in an automated interactive telephone communication system (ATS) which connects to a two-way telephone subscriber network for automated processing of communication signals from an individual caller communicating therewith over the telephone subscriber network with a TDD coupled to the network, said method comprising the steps of:

(a) providing a displayable message for transfer to the ATS, said displayable message having an entered Plain-English ASCII script format;

(b) storing the displayable message having the entered Plain-English ASCII script format in a first memory database;

(c) retrieving the displayable message of entered Plain-English ASCII script format from the first memory database and translating the displayable message from the entered Plain-English ASCII script format to a corresponding standardized TDD script format, said translation providing standardized word substitutions, abbreviations and syntax of TDD visual language with reference to a predefined rules database correlating selected plain language script with substitute standardized TDD language script;

(d) storing the TDD displayable message of standardized TDD script format in a second memory database; and (e) retrieving the TDD displayable message of standardized TDD script format from the second memory database and transferring the TDD displayable message of standardized TDD script format to the ATS.

8. The method of claim 7, wherein said step (c) includes translating the TDD displayable message from the entered Plain-English ASCII script format into the corresponding standardized TDD script format by reference to a matrix of predefined rules which provides certain logic for coordinating the translation of the TDD displayable message from the entered Plain-English ASCII script format to the standardized TDD script format.

9. The method of claim 7, wherein said providing step (a) comprises the step of providing a digital signal in ASCII code representative of the displayable message for transfer to the ATS, and wherein said transferring step (e) includes converting the digital signal in ASCII code to an analog signal in Baudot code prior to transferring said displayable message in standardized TDD script format to the ATS.

10. A computer-based TDD script generator for programming displayable messages of TDD script format in an automated interactive telephone communication system (ATS) which connects to a two-way telephone subscriber network for automated processing of communication signals from an individual caller communicating therewith over the telephone subscriber network with a TDD coupled to the network, said computer-based TDD script generator comprising:

means for entering a displayable message for transfer to the ATS, said displayable message having an entered Plain-English ASCII script format;

a first memory means and a second memory means;

means for storing the displayable message having the entered Plain-English ASCII script format in the first memory means;

means for retrieving the displayable message of entered Plain-English ASCII script format from the first memory means and for translating the displayable message of entered Plain-English ASCII script format to a corresponding standardized TDD script format, said translation providing standardized word substitutions, abbreviations and syntax of TDD visual language with reference to a predefined rules database correlating selected plain language script with substitute standardized TDD language script;

means for storing the displayable message of standardized TDD script format in said second memory means; and means for retrieving the displayable message of standardized TDD script format from the second memory means and for transferring said displayable message of standardized TDD script format to the ATS.

11. The computer-based TDD script generator of claim 10, wherein said means for translating further includes a matrix of predefined rules which provides certain logic for coordinating the translation of the displayable message from said entered Plain-English ASCII script format to said standardized TDD script format.

12. The computer-based TDD script generator of claim 10, wherein the means for entering the displayable message comprises means for entering an ASCII coded signal representative of the displayable message, and wherein the means for transferring includes means for converting said displayable message in said standardized TDD script format as an ASCII coded signal to a Baudot coded signal for transfer to the ATS across the two-way telephone subscriber network.

13. The computer-based TDD script generator of claim 10, wherein the means for transferring the displayable message of standardized TDD script format to the ATS comprises an D/A, A/D converter interface.

14. The computer-based TDD script generator of claim 10, wherein said means for entering the displayable message comprises means for entering multiple displayable messages, each of said multiple displayable messages having a unique message number associated therewith such that said multiple displayable messages define a range of associated message numbers, and wherein said means for storing the displayable message of entered Plain-English ASCII script format comprises means for storing the multiple displayable messages of entered Plain-English ASCII script format.

15. The computer-based TDD script generator of claim 14, wherein said means for retrieving the displayable message of entered Plain-English ASCII script format comprises means for retrieving at least one of the multiple displayable messages of entered Plain-English ASCII script format stored in the first memory means, said retrieving means operating by defining a message number range of messages to be retrieved from said first memory means.

16. The computer-based TDD script generator of claim 15, wherein said means for retrieving the displayable message of standardized TDD script format comprises means for retrieving at least one displayable message of standardized TDD script format from the second memory means, said retrieving means operating by defining a range of message numbers for which corresponding messages are to be retrieved from the second memory means.

17. A computer-based TDD telecommunications device which connects to a two-way telephone subscriber network for direct communication with a remotely located TDD call recipient, said computer-based TDD telecommunications device comprising:

means for entering a displayable message having an entered Plain-English ASCII script format;

computer-based means for automatically translating said displayable message from said entered Plain-English ASCII script format into a corresponding standardized TDD script format, said translation providing standardized word substitutions, abbreviations, and syntax of TDD visual language with reference to a predefined rules database correlating selected plain language script with substitute standardized TDD language script; and means for transferring said displayable message in said standardized TDD script format across the two-way telephone subscriber network to the TDD call recipient.

18. The computer-based TDD telecommunications device of claim 17, wherein said means for entering said displayable message includes a keyboard for manual entering of the displayable message.

19. The computer-based TDD telecommunications device of claim 17, wherein said computer-based means for automatically translating further includes a matrix of predefined rules which provides certain logic for coordinating the translation of said displayable message from said entered Plain-English ASCII script format to said standardized TDD script format.

20. The computer-based TDD telecommunication device of claim 17, wherein said means for entering said displayable message comprises means for entering a digital signal representative of a displayable message, said digital signal being ASCII coded, and wherein said transferring means includes means for converting the digital signal to a corresponding analog signal for transfer to the TDD call recipient.

21. The computer-based TDD of claim 20, wherein said analog signal is Baudot coded.

22. The computer-based TDD of claim 20, wherein said transferring means comprises a modem having an A/D, D/A converter interface.

23. A method for generating a displayable message of TDD script format for transfer across a two-way telephone subscriber network to a remotely located TDD call recipient in real time, said method comprising the steps of:

(a) providing a displayable message for transfer to the TDD call recipient, said displayable message having an entered Plain-English ASCII script format;

(b) automatically translating said displayable message from said entered Plain-English ASCII script format into a corresponding standardized TDD script format, said translation providing standardized word substitutions, abbreviations and syntax of TDD visual language with reference to a predefined rules database correlating selected plain language script with substitute standardized TDD language script; and (c) transferring said displayable message of standardized TDD script format across the two-way telephone subscriber network to the TDD call recipient in real time.

24. The method of claim 23, wherein said providing step (a) includes providing a digital signal in ASCII code representative of a said displayable message for transfer to the TDD call recipient, and wherein said transferring step (c) includes converting the digital signal in ASCII code to an analog signal in Baudot code prior to transfer of said displayable message of standardized TDD script format across the two-way telephone subscriber network to the TDD call recipient.

25. A method for generating a displayable message of TDD script format for an automated interactive telephone communication system (ATS) which connects to a two-way telephone subscriber network for automated processing of communication signals from an individual caller communicating therewith over the telephone subscriber network with a TDD, said method comprising the steps of:

(a) providing a displayable message for transfer to the ATS, said displayable message having an entered Plain-English ASCII script format;

(b) automatically translating said displayable message from said entered Plain-English ASCII script format into a corresponding Standardized TDD script format, said translation providing standardized word substitutions, abbreviations, and syntax of TDD visual language with reference to a predefined rules database correlating selected plain language script with substitute standardized TDD language script; and (c) transferring said displayable message in the Standardized TDD script format to the ATS.

26. The method of claim 25, wherein said transferring step (c) further comprises converting said displayable message in said standardized TDD script format as a digital signal to an analog signal for transfer to the ATS across the two-way telephone subscriber network.

27. The method of claim 26, wherein said transferring step (c) includes converting said displayable message in said standardized TDD script format as an ASCII coded digital signal to a Baudot analog signal for transfer to the ATS.

* * * * *